United States Patent
Lee

(10) Patent No.: US 12,395,603 B2
(45) Date of Patent: Aug. 19, 2025

(54) SINK DEVICE, SOURCE DEVICE, AND METHOD FOR CONTROLLING THE SAME

(71) Applicant: SAMSUNG ELECTRONICS CO., LTD., Suwon-si (KR)

(72) Inventor: Seonyul Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 46 days.

(21) Appl. No.: 18/210,937

(22) Filed: Jun. 16, 2023

(65) Prior Publication Data

US 2024/0073355 A1 Feb. 29, 2024

Related U.S. Application Data

(63) Continuation of application No. PCT/KR2023/007587, filed on Jun. 2, 2023.

(30) Foreign Application Priority Data

Aug. 26, 2022 (KR) .................. 10-2022-0107625

(51) Int. Cl.
*H04N 5/44* (2011.01)
*G09G 5/00* (2006.01)
(Continued)

(52) U.S. Cl.
CPC .......... *H04N 5/44* (2013.01); *H04N 21/42646* (2013.01); *H04N 21/43622* (2013.01); *H04N 21/43635* (2013.01)

(58) Field of Classification Search
CPC ............................. H02J 7/00; H04N 21/4122
See application file for complete search history.

(56) References Cited

U.S. PATENT DOCUMENTS 8,072,549 B2 12/2011 Inoue et al.
8,253,859 B2 8/2012 Suzuki et al.
(Continued)

FOREIGN PATENT DOCUMENTS

CN 102970576 B 9/2015
JP 2020-150445 A 9/2020
(Continued)

OTHER PUBLICATIONS

International Search Report (PCT/ISA/210) issued Sep. 12, 2023 by the International Searching Authority in International Patent Application No. PCT/KR2023/007587.
(Continued)

*Primary Examiner* — Getente A Yimer
(74) *Attorney, Agent, or Firm* — Sughrue Mion, PLLC

(57) ABSTRACT

A first electronic device includes: at least one processor configured to: transmit first EDID information including a first block structure to a second electronic device; receive AV data from the second electronic device; identify an output state of the AV data; based on that the output state of the AV data is identified as abnormal, requesting a first parameter to the second electronic device; generate third EDID information including a second block structure based on the first parameter, a second parameter related to a number of ACKs obtained based on storing the first EDID information in the at least one memory of the first electronic device, or a third parameter related to a number of blocks of fourth EDID information; and transmit a HPD signal for transmitting third EDID information including the second block structure to the second electronic device.

17 Claims, 10 Drawing Sheets

(51) Int. Cl.
*H04N 21/426* (2011.01)
*H04N 21/436* (2011.01)
*H04N 21/4363* (2011.01)

(56) References Cited

U.S. PATENT DOCUMENTS

| | | |
|---|---|---|
| 8,817,182 B2 | 8/2014 | Suzuki et al. |
| 8,854,543 B2 | 10/2014 | Suzuki et al. |
| 8,982,278 B2 | 3/2015 | Suzuki et al. |
| 8,982,279 B2 | 3/2015 | Suzuki et al. |
| 9,024,924 B2 | 5/2015 | Imai et al. |
| 9,055,281 B2 | 6/2015 | Park et al. |
| 9,065,963 B2 | 6/2015 | Suzuki et al. |
| 9,307,204 B1 | 4/2016 | Garg et al. |
| 9,544,535 B2 | 1/2017 | Suzuki et al. |
| 10,205,996 B2 | 2/2019 | Oh |
| 10,616,617 B2 | 4/2020 | Oh et al. |
| 11,158,284 B2 | 10/2021 | Oh |
| 11,184,667 B2 | 11/2021 | Suzuki et al. |
| 11,350,158 B2 | 5/2022 | Shin et al. |
| 11,477,517 B2 | 10/2022 | Jang |
| 11,694,650 B2 | 7/2023 | Oh |
| 2004/0170135 A1* | 9/2004 | Sugaya ............... H04W 74/04 370/314 |
| 2006/0161774 A1* | 7/2006 | Huh .................... H04L 9/321 713/168 |
| 2007/0050200 A1* | 3/2007 | Kampert ........... G06Q 10/0833 705/333 |
| 2007/0186015 A1 | 8/2007 | Taft et al. |
| 2011/0068736 A1* | 3/2011 | Chartier ................ H02J 7/00 320/137 |
| 2012/0195309 A1* | 8/2012 | Okuda ................. H04W 28/06 370/389 |
| 2013/0207942 A1 | 8/2013 | Imai et al. |
| 2016/0086567 A1* | 3/2016 | Suzuki ............... H04N 21/4122 348/552 |
| 2021/0185304 A1 | 6/2021 | Kim et al. |

FOREIGN PATENT DOCUMENTS

| | | |
|---|---|---|
| JP | 2021-90177 A | 6/2021 |
| KR | 10-0772416 B1 | 11/2007 |
| KR | 10-0831141 B1 | 5/2008 |
| KR | 10-2011-0128129 A | 11/2011 |
| KR | 10-1366912 B1 | 2/2014 |
| KR | 10-2016-0052095 A | 5/2016 |
| KR | 10-2020-0029854 A | 3/2020 |
| KR | 10-2020-0132541 A | 11/2020 |
| KR | 10-2189726 B1 | 12/2020 |
| KR | 10-2021-0075724 A | 6/2021 |
| KR | 10-2022-0068008 A | 5/2022 |
| WO | 2015/190877 A1 | 12/2015 |
| WO | 2016/171508 A1 | 10/2016 |

OTHER PUBLICATIONS

Written Opinion (PCT/ISA/237) issued Sep. 12, 2023 by the International Searching Authority in International Patent Application No. PCT/KR2023/007587.

Communication issued on Apr. 15, 2025 by the European Patent Office in European Patent Application No. 23857495.8.

* cited by examiner

SINK DEVICE, SOURCE DEVICE, AND METHOD FOR CONTROLLING THE SAME

CROSS-REFERENCE TO RELATED APPLICATIONS

This application is a continuation application of International Application No. PCT/KR2023/007587 designating the United States, filed on Jun. 2, 2023, in the Korean Intellectual Property Receiving Office, which claims priority from Korean Patent Application No. 10-2022-0107625, filed on Aug. 26, 2022, in the Korean Intellectual Property Office, the disclosures of which are hereby incorporated by reference herein in their entireties.

BACKGROUND

1. Field

The disclosure relates to a sink device, a source device, and a method for controlling the same devices.

2. Description of Relate Art

With the development of multimedia technology, electronic devices are rapidly undergoing digital convergence. In other words, an electronic device, such as a television (TV), provides various functionalities, such as of Internet, camera, video, MP3 playback, telephony, and more, as well as a broadcast output. As a result, electronic devices are designed with multiple functional blocks to perform different functions. For example, digital TVs are evolving into smart TVs that include various functional blocks, such as a Bluetooth module for short-range communication, a wired interface module for data transmission/reception with external devices such as high-definition multimedia interface (HDMI), and a microphone for voice recognition, as well as a network communication port connected to the Internet.

SUMMARY

Performance information (specification information) of an electronic device may be included in, e.g., extended display identification data (EDID) information, which may be provided in various block structures. The disclosure provides an electronic device (e.g., a sink device) capable of selecting a particular block structure from among various block structures to implement data communication, and another electronic device (e.g., a source device) capable of coupling therewith.

According to an aspect of the disclosure, a first electronic device includes: at least one memory; at least one transceiver; and at least one processor operatively connected with the memory and the transceiver, the at least one processor configured to: transmit first extended display identification data (EDID) information including a first block structure to a second electronic device; receive audio/video (AV) data from the second electronic device; identify an output state of the AV data; based on a determination that the output state of the AV data is identified as abnormal, requesting a first parameter to the second electronic device, wherein the first parameter is related to a number of blocks of second EDID information stored in a memory of the second electronic device among the first EDID information transmitted to the second electronic device; generate third EDID information including a second block structure based on at least one of: (i) the first parameter, (ii) a second parameter related to a number of acknowledgments (ACKs) obtained based on storing the first EDID information in the at least one memory of the first electronic device, and (iii) a third parameter related to a number of blocks of fourth EDID information previously stored in the at least one memory of the first electronic device; and transmit a hot plug detect (HPD) signal for transmitting third EDID information including the second block structure to the second electronic device.

In one embodiment, the first electronic device is a sink device and the second electronic device is a source device.

According to another aspect of the disclosure, a second electronic device includes: at least one memory; at least one transceiver; and at least one processor operatively connected with the memory and the transceiver, the processor configured to: transmit a first read request for first extended display identification data (EDID) information to a first electronic device in response to receiving a first hot plug detect (HPD) signal from the first electronic device; receive the first EDID information including a first block structure from the first electronic device in response to the first read request; store the received first EDID information in the at least one memory; transmit audio/video (AV) data to the first electronic device based on the first EDID information including the first block structure; transmit a number of blocks of the first EDID information stored in the memory to the first electronic device in response to receiving a request for the number of blocks of the first EDID information; transmit a second read request for second EDID information to the first electronic device in response to receiving a second HPD signal from the first electronic device; receive second EDID information including a second block structure from the first electronic device in response to the second read request; and transmitting the AV data to the first electronic device based on the second EDID information including the second block structure.

Effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Figure 1:
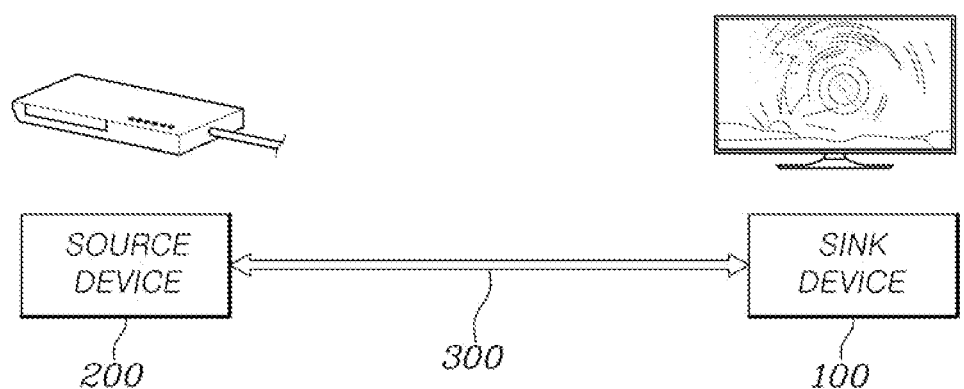
FIG. 1 illustrates a configuration of an electronic system according to an embodiment of the disclosure.

Reference may be made to the accompanying drawings in the following description, and specific examples that may be practiced are shown as examples within the drawings. Other examples may be utilized and structural changes may be made without departing from the scope of the various examples.

DETAILED DESCRIPTION

Embodiments of the disclosure are now described with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

FIG. 1 illustrates a configuration of an electronic system according to an embodiment of the disclosure.

Referring to FIG. 1, an electronic system (e.g., a high-definition multimedia interface (HDMI) system) includes a sink device 100 and a source device 200.

The source device 200 provides content to the sink device 100. The source device 200 may be implemented as any type of electronic device capable of providing content to the sink device 100, such as a set-top box, DVD player, Blu-ray disc player, PC, gaming console, or the like, and the sink device 100 may be implemented as any type of electronic device capable of outputting content provided by the source device 200, such as a network TV, smart TV, Internet TV, web TV, Internet protocol television (IPTV), signage, PC, or the like.

In particular, the sink device 100 may be implemented as a device that supports the high-speed multimedia interface (HDMI) cable 300. Accordingly, the sink device 100 and the source device 200 may be equipped with HDMI ports and may communicate with each other via their ports. As an example, the sink device 100 and the source device 200 may have HDMI 2.0 ports. Here, HDMI 2.0 is a specification optimized for ultra-high-definition environments, also known as 4K or ultra HD (UHD). The maximum bandwidth has been increased to 18 Gbps, enabling transmission of video smoothly at 60 Hz at resolutions up to 4,096×2,160 (2160p). Further, in year 2015, the HDMI 2.0a specification was released, which added support for high-dynamic-range (HDR) video, which enhances contrast and color across the screen for better-looking pictures. As used herein, the term "HDMI 2.0 specification" is used to include the HDMI 2.0a specification.

Specifically, the source device 200 may provide corresponding content to the sink device 100 based on extended display identification data (EDID) information (or "EDID" hereinafter) received from the sink device 100. Here, the EDID information is a specification for passing display information from the sink device 100, i.e., the display side, to the source device 200, i.e., the host side. EDID defines a data format for allowing the host to read the capability of the display, rather than specifying an interface signal, such as display data channel (DDC). The EDID may include information about the manufacturer's name, year/month of manufacture, product type, EDID version, resolution and color coordinates of the product, phosphor or filter type, timing, screen size, luminance, pixels, and more.

In particular, the HDMI specification uses vendor specific data block (VSDB) to store resolution information and color information about the sink device 100, and implements the source device 200 to read the VSDB information and transmit the corresponding content to the sink device 100. However, according to an embodiment of the disclosure, the sink device 100 may store additional color information and resolution information in a memory area other than the VSDB, which defines resolution information and color information in the HDMI specification, and the source device 200 may read it from the source device 200, and receive and output corresponding content.

Figure 2:
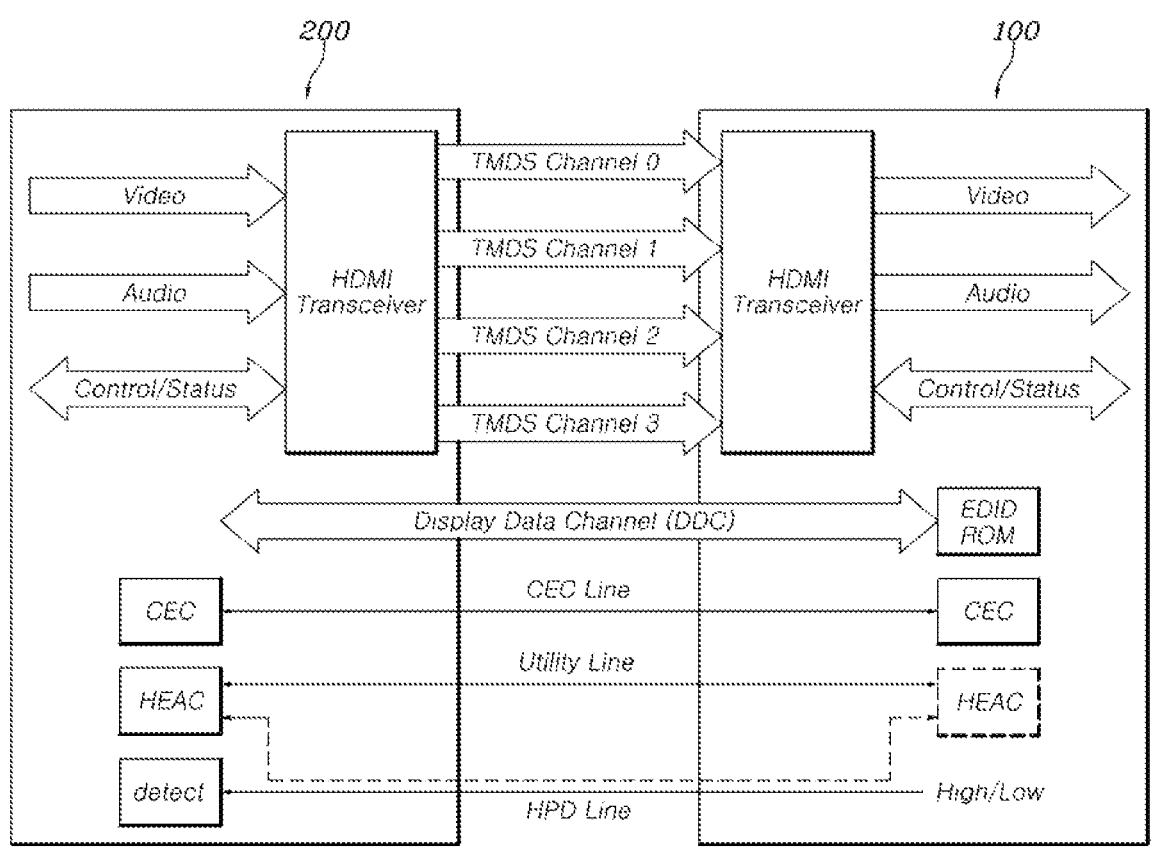
FIG. 2 illustrates an HDMI system and data transmission/reception channels included in the HDMI system, according to an embodiment of the disclosure.

FIG. 2 illustrates a high-definition multimedia interface (HDMI) system and data transmission/reception channels included in the HDMI system, according to an embodiment of the disclosure.

Devices that transmit and receive video/audio/control data using HDMI may be collectively referred to as an 'HDMI system,' which may include a source device 200, a sink device 100, and a cable. In the HDMI system, a device transmitting video/audio data via HDMI corresponds to a source device 200, a device receiving video/audio data via HDMI corresponds to a sink device 100, and an HDMI cable (300 in FIG. 1) is provided that connects the two devices to support data transmission/reception.

The source device 200 may include an HDMI transceiver that transmits and receives data over the HDMI cable 300, and a controller that controls data communication through the HDMI cable 300 of the source device and the HDMI transceiver. The sink device 100 may include an HDMI transceiver that transmits and receives data over the HDMI cable 300, and a controller that controls data communication through the HDMI of the sink device and the HDMI transceiver.

The HDMI cable (300 in FIG. 1) and connectors may pair four channels that provide a transition minimized differential signaling (TMDS) data channel and a TMDS clock channel. The channels may be used to carry video data, audio data, and auxiliary data.

Further, the HDMI system provides the Video Electronics specifications Association (VESA) Display Data Channel (DDC). The DDC is used to exchange configuration and status information between one source device and one sink device. A consumer electronics control (CEC) protocol may provide a high-level control between the various audio/visual (AV) products in a user environment, and may be used optionally. Further, an optional HDMI Ethernet and audio return channel (HEAC) may provide Ethernet-compatible data networking between the audio return channel (ARC) and connected devices in the opposite direction from the TMDS.

Video data, audio data, and additional data may be transmitted or received through the three TMDS data channels. The TMDS clock, which typically runs the video pixel rate, is transmitted through the TMDS clock channel. The TMDS clock may be used by HDMI transceivers as a frequency reference for data recovery on the three TMDS data channels. At the source device, the eight (8) bits of data per TMDS data channel may be converted into a 10-bit, DC-balanced, transition-minimized sequence that may then be serially transmitted at a rate of 10 bits per TMDS clock period.

To transmit audio data and additional data through the TMDS channel, HDMI uses a packet structure. To achieve high reliability for audio data and control data, the data may be transmitted as 10-bit words generated using broadcast channel (BCH) error correction codes and error reduction coding.

The source device may read the display data channel (DDC) and the enhanced extended display identification data (E-EDID) of the sink device to determine the configuration information and possible capabilities of the sink device.

The utility line may be used for optional extensions such as HEAC.

The CEC may include a variety of features that enhance the interoperability and functionality between devices within an HDMI system. The HDMI-CEC protocol allows a user to use a control device (such as a remote control device) of the sink device to control the source device connected with the sink device via HDMI as well as the sink device. The HDMI-CEC protocol is described in more detail below.

Table 1 and Table 2 (below) show the configurations/features provided by the HDMI-CEC protocol. In particular, table 1 shows the end-user configuration/features provided by the CEC.

TABLE 1

| | |
|---|---|
| One Touch Play | playback starts with a click of a button and the device changes to the active source state |
| System Standby | switches all connected devices into standby mode |
| One Touch Record | controls the function of recording the content played on TV |
| Timer Programming | sets a timer of one device by another device |
| Deck Control | controls the playback device by another device |
| Tuner Control | controls the tuner of another device |
| Device Menu Control | enables device menus to be controlled on TV remote controller |
| Remote Control Pass Through | transmits input from the remote controller to another device |
| System Audio Control | transmits commands to control audio |

Table 2 shows the configurations/features supported by CEC.

TABLE 2

| | |
|---|---|
| Device on-screen display (OSD) Name Transfer | transmits a set device name to a TV set |
| Device Power Status | checks the current power status of the device |
| OSD Display | transmits text for the device to appear on a TV set's screen |
| Routing Control | controls the routing of the HDMI network based on that the CEC switch is in use |
| System Information | sets the device to use the same OSD and menu language as the TV |
| Vendor Specific Commands | manufacturer-defined commands |
| Audio Rate Control | moves the audio source slightly forward or backward |
| Audio Return Channel Control | used to control the audio return channel (ARC) |
| Capability Discovery and Control | used to control the HDMI Ethernet channel (HEC) |

To address and control a switching of specific physical devices using the HDMI-CEC protocol, the devices of the HDMI system have 'physical' addresses. The physical address is determined by the physical address recovery operation, and the sink device may generate and use a unique physical address consisting of four 4-bit numbers (e.g., n.n.n.n). Further, CEC-enabled devices may have 'logical' addresses based on the characteristics of each device.

In addition to the terms "source device" and "sink device", the terms "initiator" and "follower" may be used in relation to the HDMI-CEC protocol. An initiator is a device that transmits or has sent a CEC message, in some cases, a device waiting for a response from a follower, and a follower is a device that receives a CEC message and needs to respond to the received message.

Figure 3:
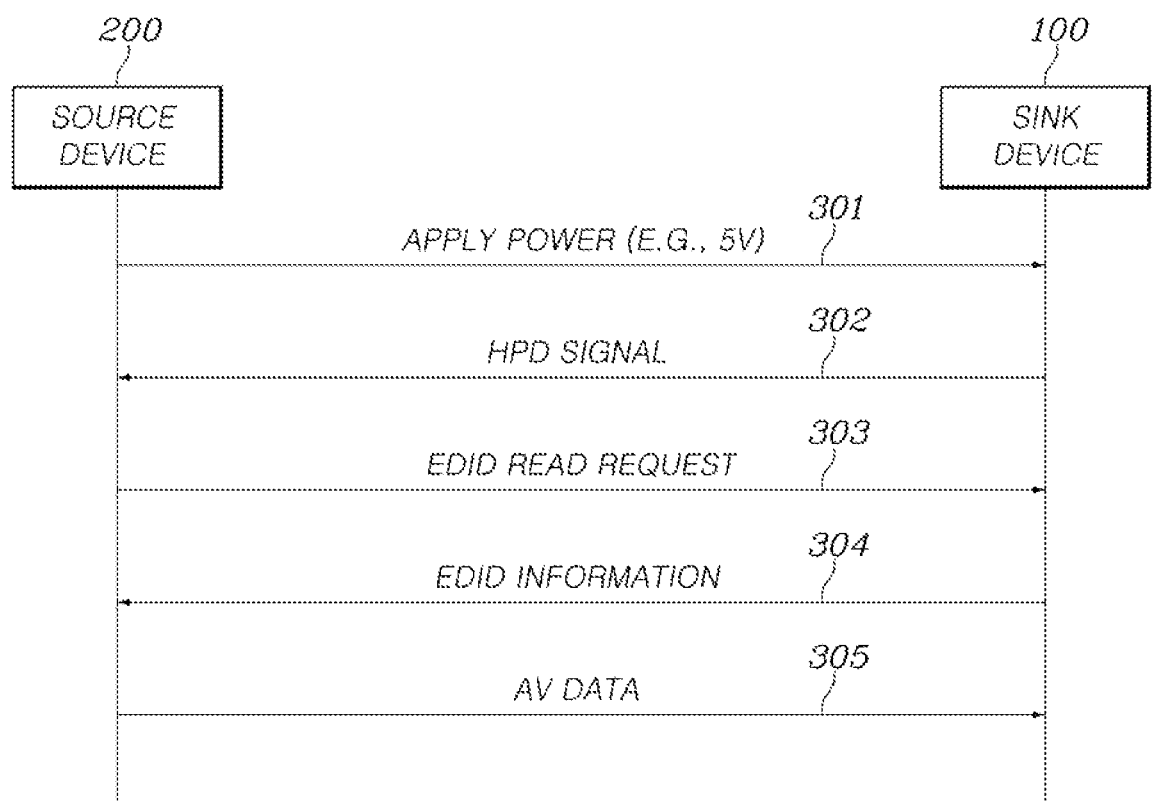
FIG. 3 illustrates an example AV data transmission/reception method according to an embodiment of the disclosure.

FIG. 3 is a view illustrating an example AV data transmission/reception method according to an embodiment of the disclosure.

In an embodiment, the source device 200 and the sink device 100 are connected by an HDMI cable 300. In an embodiment, based on that the HDMI cable is connected, the source device 200 may switch a 5-volt power line from a low level to a high level and apply current (operation 301). This allows the source device 200 to operate an electrically erasable programmable read-only memory (EEPROM) and related circuit that stores the EDID information of the sink device 100. In an embodiment, the EDID information may be stored in the memory (e.g., EEPROM) of the sink device 100.

In an embodiment, the sink device 100 may switch the hot plug detect (HPD) line from a low level to a high level (operation 302). This allows the sink device 100 to inform the source device 200 that the cable (e.g., HDMI cable) is properly connected and that the EDID-related circuit is enabled to let the EDID information accessible.

In an embodiment, the source device 200 may transmit a request to read EDID information via the DDC to the sink device 100 (operation 303).

In an embodiment, in response to the EDID read request from the source device 200, the sink device 100 may transmit EDID information stored in the memory (e.g., EEPROM) via the DDC (operation 304). In an embodiment, the EDID information may include either a 2 Block EDID or a 4 Block EDID. In the disclosure, the 4 Block EDID may be EDID information having a first block structure, and the 2 Block EDID may be EDID information having a second block structure. In an embodiment, the first block structure may be defined based on at least some of VESA, extension block map, CEA-861, and CEA-861/display identification data (DisplayID). In an embodiment, the second block structure may be defined based on at least some of VESA and CEA-861. Here, the first block structure and the second block structure may each include a plurality of blocks (e.g., 128-byte data blocks).

In an embodiment, the source device 200 may transmit AV data to the sink device 100 (operation 305).

Figure 4:
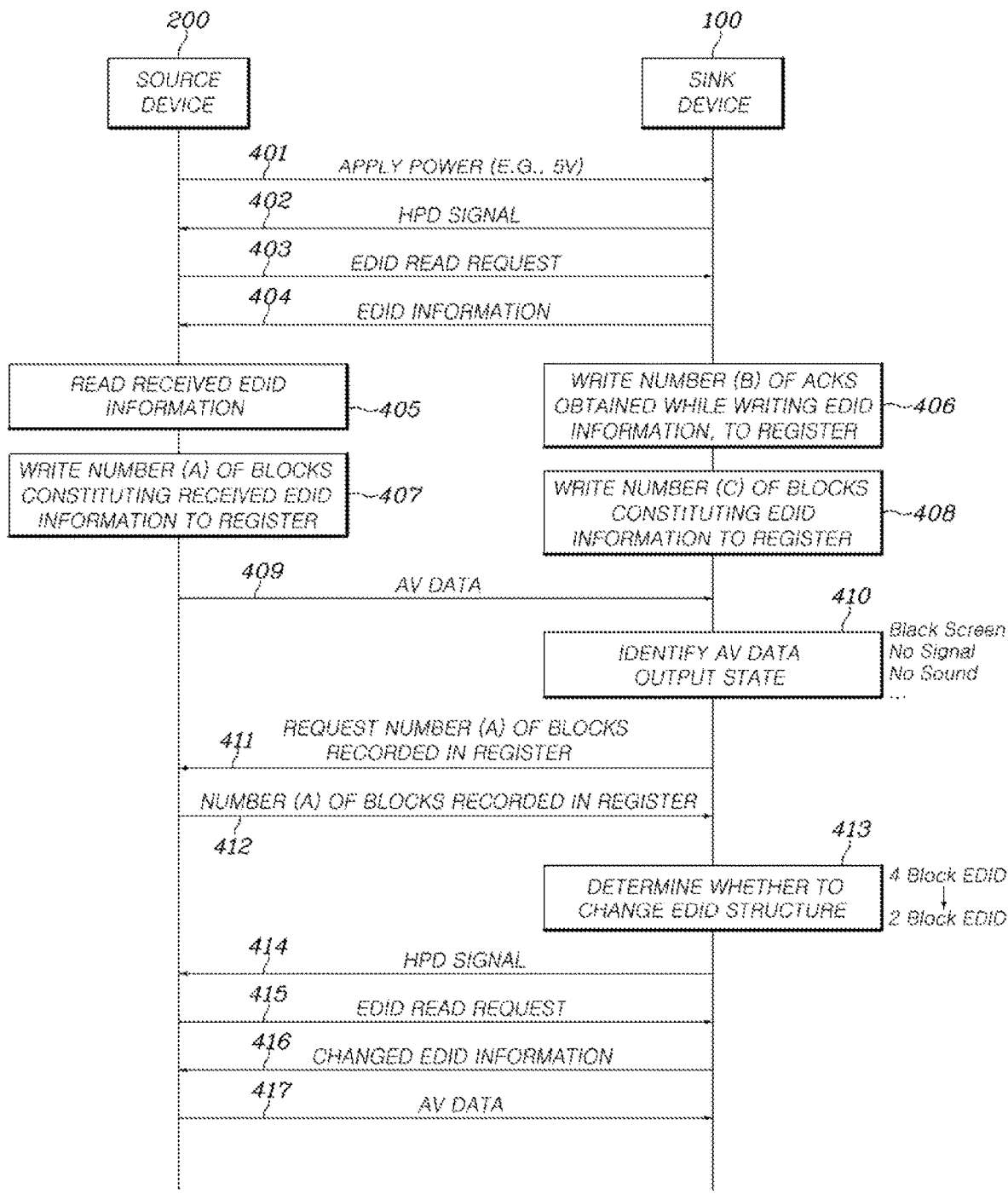
FIG. 4 illustrates an example AV data transmission/reception method according to an embodiment of the disclosure.

FIG. 4 illustrates an example of an AV data transmission/reception method according to an embodiment of the disclosure.

The transmission/reception method of FIG. 4 is common to at least one operation of the transmission/reception method of FIG. 3, and the following description focuses primarily on the differences. Among the operations of FIG. 4, operations 401, 402, 403, and 404 may correspond to operations 301, 302, 303, and 304 of FIG. 3, respectively.

In an embodiment, the source device 200 may read the EDID information received from the sink device 100 (operation 405). The received EDID information may have a four-block EDID structure defined based on at least some of, e.g., VESA, extension block map, CEA-861, and CEA-861/DisplayID. The received EDID information may have a two-block EDID structure defined based on at least some of, e.g., VESA and CEA-861.

In an embodiment, the sink device 100 may write a number of acknowledgments (ACKs) obtained while writing EDID information to the memory (e.g., EEPROM) or to a register (e.g., SCDC reserved register) (operation 406).

The plurality of blocks constituting the EDID information are each 128 bytes long, and the ACKs may be identified once per byte. In other words, 128 ACKs may be detected while writing one block. As a result, the number of ACKs stored in the register may be determined to be 128 per block. In the following description, the "number of ACKs" may be referred to as a 'second parameter.'

In an embodiment, the source device 200 may write, to the register, the number of blocks constituting the received EDID information (operation 407). In an embodiment, the number of blocks constituting the EDID information may be determined based on the block structure of the EDID information. For example, the first block structure of EDID information may be defined based on at least some of VESA, extension block map, CEA-861, and CEA-861/display identification data (DisplayID), wherein the number of blocks in the first block structure may be determined to be four blocks. For example, the second block structure of EDID information may be defined based on at least some of VESA and CEA-861, wherein the number of blocks in the second block structure may be determined to be two blocks. In the following description, the number of blocks of EDID information written to the register (e.g., SCDC reserved register) of the source device 200 may be referred to as a 'first parameter.'

In an embodiment, the sink device 100 may write, to the register (e.g., the SCDC reserved register), the number of blocks of EDID information represented in the memory 408. In an embodiment, the number of blocks constituting the EDID information written in the memory may be determined based on the block structure of the EDID information. For example, the first block structure of EDID information may be defined based on at least some of VESA, extension block map, CEA-861, and CEA-861/display identification data (DisplayID), wherein the number of blocks in the first block structure may be determined to be four blocks.

For example, the second block structure of EDID information may be defined based on at least some of VESA and CEA-861, wherein the number of blocks in the second block structure may be determined to be two blocks. In the following description, the number of blocks of EDID information written to the memory (e.g., EEPROM) of the sink device 100 may be referred to as a third parameter.

In the disclosure, the number of blocks constituting the EDID information described above in connection with operation 407 and the number of blocks constituting the EDID information described above in connection with operation 408 should be the same, but may be detected as different due to operational errors in the system or performance differences between the sink device 100 and the source device 200.

In an embodiment, the source device 200 may transmit AV data to the sink device 100 (operation 409).

In an embodiment, the sink device 100 may identify the output state of the received AV data 410. The sink device 100 needs to output the received AV data through a display or speaker, but may not do so in the event of an error. In an embodiment, the sink device 100 may identify the output state as either normal or abnormal. The abnormal output state may include, but is not limited to, at least one of black screen, no signal, and no sound.

In an embodiment, based on determining that the output state is abnormal, the sink device 100 may request a first parameter from the source device 200 (operation 411).

In an embodiment, based on receiving the request for the first parameter, the source device 200 may transmit the first parameter to the sink device 100 (operation 412). In an embodiment, the source device 200 may transmit the first parameter to the sink device 100 in response to receiving the first parameter request.

In an embodiment, the sink device 100 may determine whether to change the block structure of the EDID information (operation 413). Based on that the source device 200 does not have the capability to analyze the EDID information transmitted by the sink device 100, an output error may occur due to compatibility issues.

According to an embodiment of the disclosure, the sink device 100 may determine whether to change the number of blocks of EDID information to be transmitted. In an embodiment, the sink device 100 may change the number of blocks to reduce. For example, the sink device 100 may change the four-block EDID structure (a first block structure) to a two-block EDID structure (a second block structure) and retry the connection between the devices.

In an embodiment, the EDID information having the second block structure may be generated based on at least one of a correlation between the first parameter and the second parameter, and a correlation between the first parameter and the third parameter.

In an embodiment, the sink device 100 may identify that the first parameter is equal to $1/128$ of the second parameter. Based on that the first parameter is not equal to $1/128$ of the second parameter, the sink device 100 may change the block structure of the EDID information to the above-described second block structure regardless of the correlation between the first parameter and the third parameter, generating EDID information having the second block structure.

Figure 7:
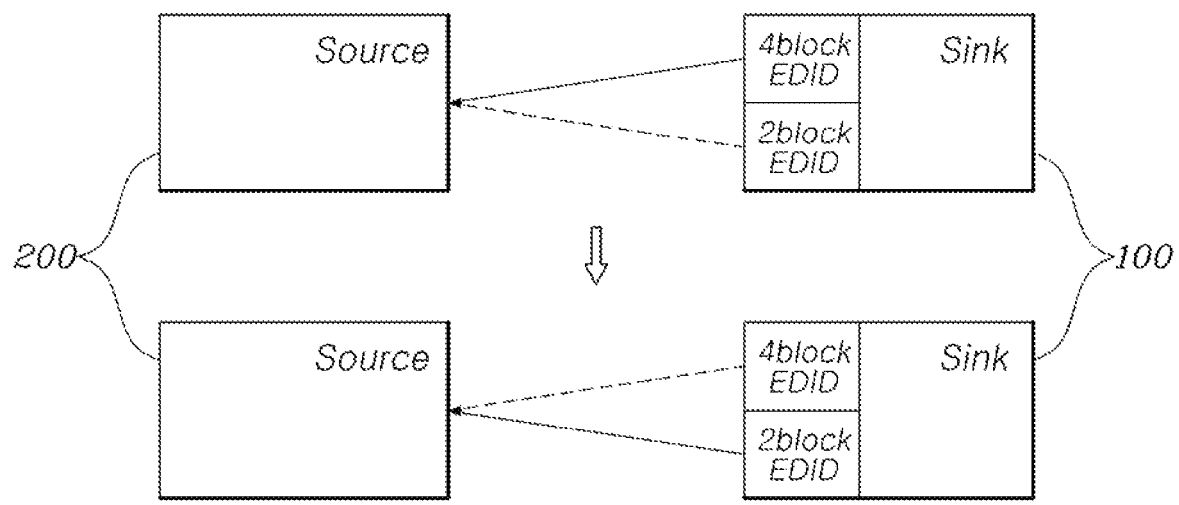
FIG. 7 illustrates a block structure transition by a sink device.

In an embodiment, the sink device 100 may determine whether to generate EDID information having the second block structure based on the correlation between the first parameter and the third parameter based on that the first parameter is equal to the second parameter minus a predetermined value (e.g., 128). In an embodiment, based on that the first parameter and the third parameter are not the same, the sink device 100 may change the block structure of the EDID information to the above-described second block structure to generate EDID information having the second block structure. The generated EDID information having the second block structure may be transmitted to the source device subsequently to transmission of the second HPD signal to the source device 200 (see FIG. 7).

In an embodiment, based on that the first parameter is equal to $1/128$ of the second parameter, and based on that the first parameter and the third parameter are equal, the sink device 100 may not perform the operations after operation 414. This is why it is the case where an operation error related to the block structure of EDID information is not identified based on the correlation between the first parameter through the third parameter, so that other operation errors irrelevant to the EDID information need to be checked. In an embodiment, if an operation error irrelevant to EDID information is detected based on the first parameter through third parameter as described above, the sink device 100 may maintain the abnormal output state while outputting a message on the display to indicate the operation error.

In an embodiment, a hot plug detect (HPD) signal for transmitting the block structure-changed EDID information to the source device 200 may be transmitted to the source device 200 (operation 414). In the disclosure, the HPD signal for transmitting EDID information with a changed block structure may be referred to as a second HPD signal, and the HPD signal for transmitting EDID information before the block structure was changed may be referred to as a first HPD signal. Subsequent operations 415, 416, and 417 correspond to operations 303, 304, and 305 of FIG. 3, respectively.

According to an embodiment of the disclosure, it may be identified whether the block structure of the EDID information from the sink device to the source device is also appropriate on the source device. Further, according to an embodiment, the sink device may normally output AV data received from the source device by changing the block structure of the EDID information.

Figure 5:
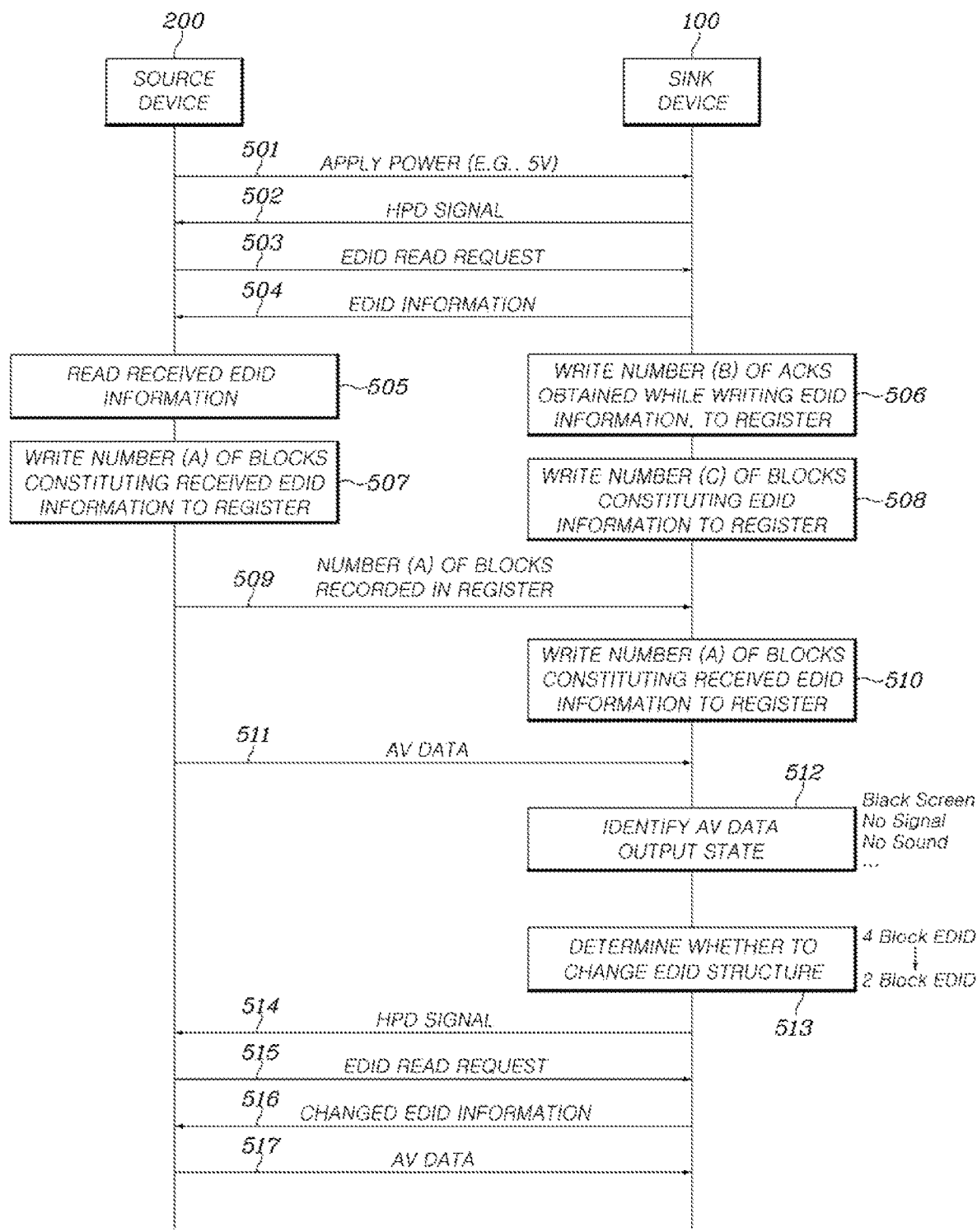
FIG. 5 illustrates an example AV data transmission/reception method according to an embodiment of the disclosure.

FIG. 5 illustrates an example of an AV data transmission/reception method according to an embodiment of the disclosure.

The transmission/reception method of FIG. 5 is common to at least one operation of the transmission/reception method of FIG. 3, and the following description focuses primarily on the differences. Among the operations of FIG. 5, operations 501, 502, 503, and 504 may respectively correspond to operations 301, 302, 303, and 304 of FIG. 3. Among the operations of FIG. 5, operations 505, 506, 507, and 508 may respectively correspond to operations 405, 406, 407, and 408 of FIG. 4.

In an embodiment, the source device 200 may transmit the first parameter to the sink device 100 based on writing the first parameter to the register (operation 509). In an embodiment, the source device 200 may transmit the first parameter to the sink device 100 regardless of receiving the first parameter request from the sink device 100, as shown in FIG. 4. For example, in response to completing writing the first parameter to the register, the first parameter may be transmitted to the sink device 100.

In an embodiment, the sink device 100 may write the first parameter received from the source device 200 in the memory 510. The memory may include, but is not limited to, EEPROM or SCDC reserved register.

In an embodiment, the source device 200 may transmit AV data to the sink device 100 (operation 511).

In an embodiment, the sink device 100 may identify the output state of the received AV data (operation 512). The sink device 100 needs to output the received AV data through a display or speaker, but may not do so in the event of an error. In an embodiment, the sink device 100 may identify the output state as either normal or abnormal. The abnormal output state may include, but is not limited to, at least one of black screen, no signal, and no sound.

In an embodiment, the sink device 100 may determine whether to change the block structure of the EDID information (operation 513).

In an embodiment, the sink device 100 may identify whether to change the block structure of the EDID information in response to the output state being identified as abnormal.

Specifically, according to an embodiment of the disclosure, the sink device 100 may determine whether to change the number of blocks of EDID information and transmit it. In an embodiment, the sink device 100 may change the number of blocks to reduce. For example, the sink device 100 may change the four-block EDID structure (first block structure) to a two-block EDID structure (second block structure) and retry the connection between the devices.

In an embodiment, the EDID information having the second block structure may be generated based on at least one of a correlation between the first parameter and the second parameter, and a correlation between the first parameter and the third parameter.

In an embodiment, the sink device 100 may identify that the first parameter is equal to $1/128$ of the second parameter.

Based on that the first parameter is not equal to $1/128$ of the second parameter, the sink device 100 may change the block structure of the EDID information to the above-described second block structure regardless of the correlation between the first parameter and the third parameter, generating EDID information having the second block structure.

In an embodiment, the sink device 100 may determine whether to generate EDID information having the second block structure based on the correlation between the first parameter and the third parameter based on that the first parameter is equal to the second parameter minus a predetermined value (e.g., 128). In an embodiment, based on that the first parameter and the third parameter are not the same, the sink device 100 may change the block structure of the EDID information to the above-described second block structure to generate EDID information having the second block structure (see FIG. 7).

In an embodiment, based on that the first parameter is equal to $1/128$ of the second parameter, and based on that the first parameter and the third parameter are equal, the sink device 100 may not perform the operations after operation 514. This is why it is the case where an operation error related to the block structure of EDID information is not identified based on the correlation between the first parameter through the third parameter, so that other operation errors irrelevant to the EDID information need to be checked. In an embodiment, if an operation error irrelevant to EDID information is detected based on the first parameter through third parameter as described above, the sink device 100 may maintain the abnormal output state while outputting a message on the display to indicate the operation error.

In an embodiment, a HPD signal for transmitting the block structure-changed EDID information to the source device 200 may be transmitted to the source device 200 (operation 514). In the disclosure, the HPD signal for transmitting EDID information with a changed block structure may be referred to as a second HPD signal, and the HPD signal for transmitting EDID information before the block structure was changed may be referred to as a first HPD signal. Subsequent operations 515, 516, and 517 respectively correspond to operations 303, 304, and 305 of FIG. 3.

Thus, according to an embodiment of the disclosure, although not receiving a predetermined request from the source device, the sink device may identify whether the block structure of the EDID information from the sink device to the source device is also appropriate on the source device. Further, according to an embodiment, the sink device may normally output AV data received from the source device by changing the block structure of the EDID information.

Figure 6:
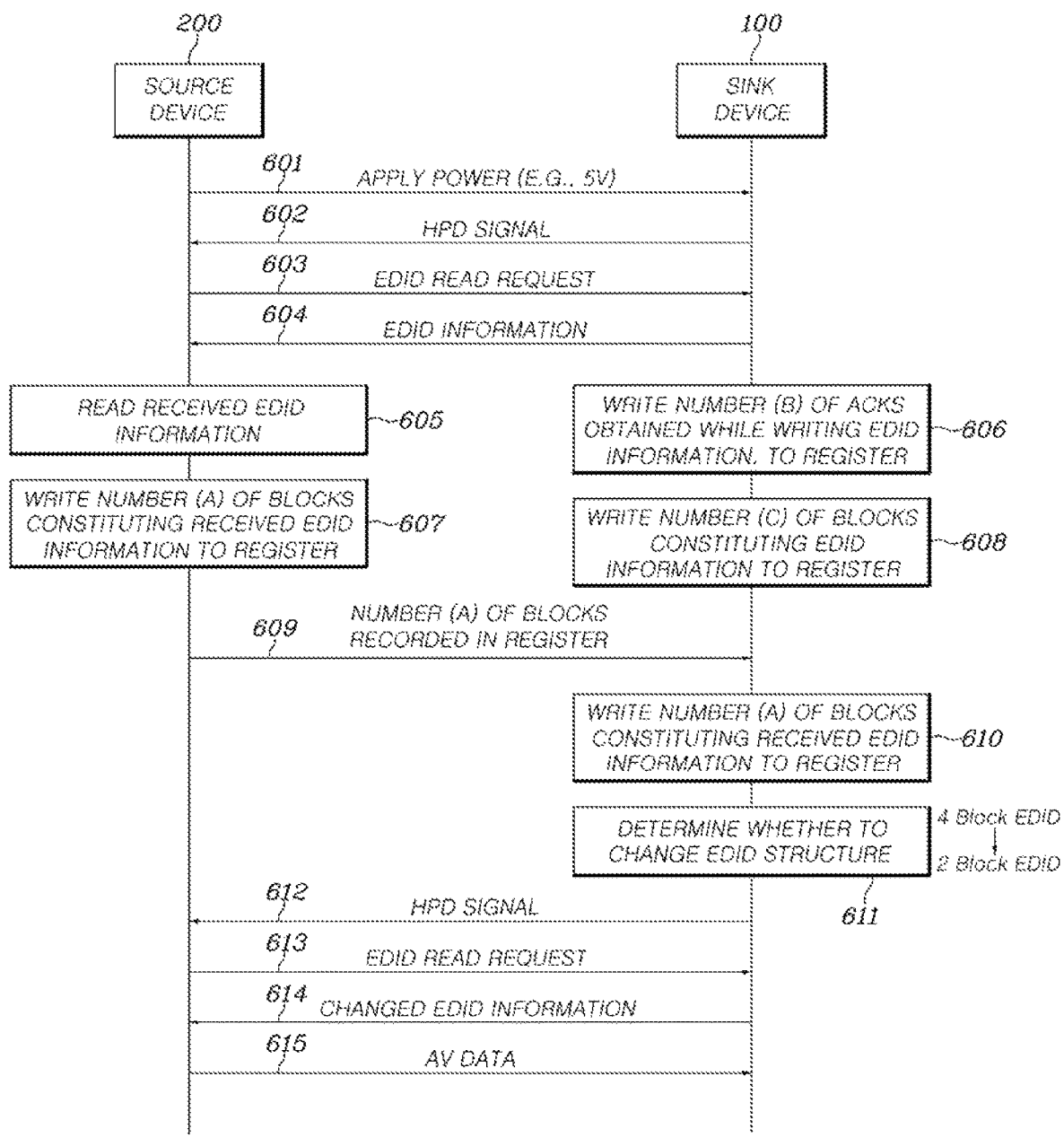
FIG. 6 illustrates an example AV data transmission/reception method according to an embodiment of the disclosure.

FIG. 6 illustrates an example of an AV data transmission/reception method according to an embodiment of the disclosure.

The transmission/reception method of FIG. 6 is common to at least one operation of the transmission/reception method of FIG. 3, and the following description focuses primarily on the differences. Among the operations of FIG. 6, operations 601, 602, 603, and 604 may respectively correspond to operations 301, 302, 303, and 304 of FIG. 3. Among the operations of FIG. 6, operations 605, 606, 607, and 608 may respectively correspond to operations 405, 406, 407, and 408 of FIG. 4. Further, among the operations of FIG. 6, operation 609 may correspond to operation 509 of FIG. 5.

In an embodiment, the sink device 100 may write the first parameter received from the source device 200 in the memory 610. The memory may include, but is not limited to, EEPROM or SCDC reserved register.

In an embodiment, the sink device 100 may determine whether to change the block structure of the EDID information based on the first parameter written in the memory (operation 611).

In an embodiment, the sink device 100 may determine whether to change the block structure of the EDID information in response to completion of writing the first parameter to the memory.

Specifically, according to an embodiment of the disclosure, the sink device 100 may determine whether to change the number of blocks of EDID information and transmit the changed number of blocks of EDID information. In an embodiment, the sink device 100 may change the number of blocks to reduce. For example, the sink device 100 may change the four-block EDID structure (a first block structure) to a two-block EDID structure (a second block structure) and retry the connection with the source device 200.

In an embodiment, the EDID information having the second block structure may be generated based on at least one of a correlation between the first parameter and the second parameter, and a correlation between the first parameter and the third parameter.

In an embodiment, the sink device 100 may identify that the first parameter is equal to $1/128$ of the second parameter. Based on that the first parameter is not equal to $1/128$ of the second parameter, the sink device 100 may change the block structure of the EDID information to the above-described second block structure regardless of the correlation between the first parameter and the third parameter, generating EDID information having the second block structure.

In an embodiment, the sink device 100 may determine whether to generate EDID information having the second block structure based on the correlation between the first parameter and the third parameter based on that the first parameter is equal to the second parameter minus a predetermined value (e.g., 128). In an embodiment, based on that the first parameter and the third parameter are not the same, the sink device 100 may change the block structure of the EDID information to the above-described second block structure to generate EDID information having the second block structure (see FIG. 7).

In an embodiment, based on that the first parameter is equal to $1/128$ of the second parameter, and based on that the first parameter and the third parameter are equal, the sink device 100 may not perform the operations after operation 612. This is why it is the case where an operation error related to the block structure of EDID information is not identified based on the correlation between the first parameter through the third parameter, so that other operation errors irrelevant to the EDID information need to be checked. In an embodiment, if an operation error irrelevant to EDID information is detected based on the first parameter through third parameter as described above, the sink device 100 may maintain the abnormal output state while outputting a message on the display to indicate the operation error.

In an embodiment, a HPD signal for transmitting the block structure-changed EDID information to the source device 200 may be transmitted to the source device 200 (612). In the disclosure, the HPD signal for transmitting EDID information with a changed block structure may be referred to as a second HPD signal, and the HPD signal for transmitting EDID information before the block structure was changed may be referred to as a first HPD signal. Subsequent operations 613, 614, and 615 respectively correspond to operations 303, 304, and 305 of FIG. 3.

Thus, according to an embodiment of the disclosure, although not identifying the output state of the sink device, the sink device may previously identify whether the block structure of the EDID information from the sink device to the source device is also appropriate on the source device. Further, according to an embodiment, the sink device may normally output AV data received from the source device by changing the block structure of the EDID information.

Figure 8:
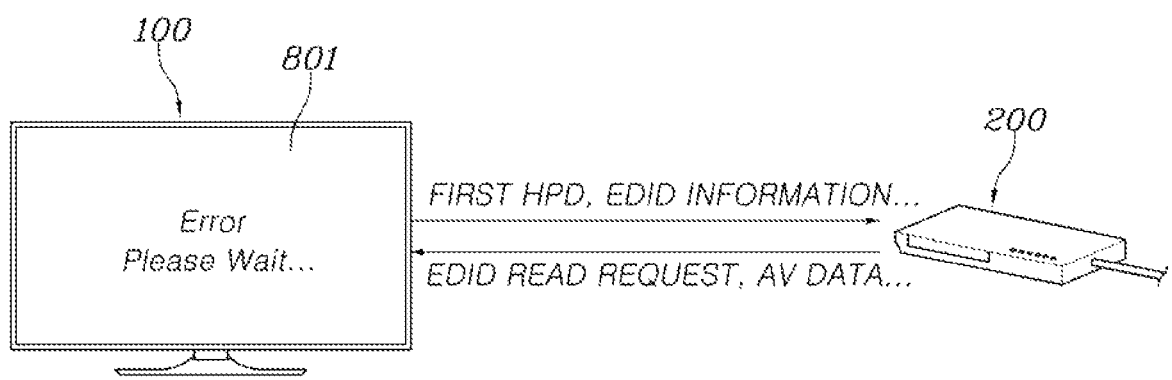
FIGS. 8 and 9 illustrate changes in a display screen of a sink device, according to an embodiment.
Figure 9:
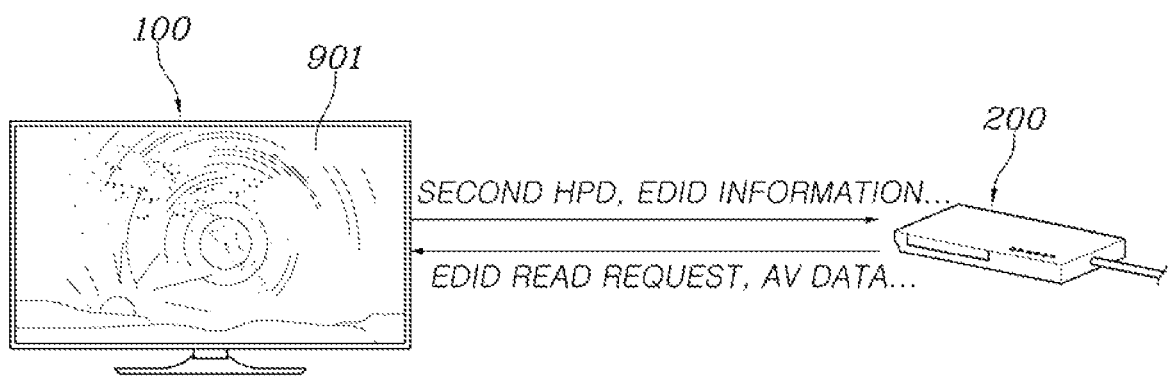

FIGS. 8 and 9 illustrate changes in a display screen of a sink device, according to an embodiment.

In FIG. 8, the sink device 100 and the source device 200 may transmit and receive data via the HDMI cable 300 of FIG. 1. In an embodiment, the sink device 100 may provide EDID information to the source device 200, starting with a first HPD signal, and may receive AV data from the source device 200 and output the received data in the form of an image or sound via an output unit (e.g., a display or a speaker). As described above with reference to FIGS. 4 to 6, the sink device may in some cases fail to output AV data in the form of an image or sound, which is referred to herein as an abnormal output state.

According to an embodiment, based on that the sink device 100 determines that the output state is abnormal, the sink device 100 may output a predetermined guidance screen 801 on the display while the abnormal output state is maintained. The guidance screen 801 may include, but is not limited to, a phrase indicating an error (e.g., "Error"). The guidance screen 801 may include, but is not limited to, a phrase indicating that the error is being automatically addressed (e.g., "Please Wait").

In an embodiment, the sink device 100 may change the block structure of the EDID information based on receiving a user's input to change (e.g., reduce) the block structure of the EDID information, but the sink device 100 according to an embodiment of the disclosure may change the block structure of the EDID information regardless of the user's input.

In an embodiment, while the sink device 100 addresses the abnormal output state by changing (e.g., decreasing) the block structure of the EDID information, the sink device 100 may display, on the display 801, a phrase indicating an error or a phrase indicating that the error is being addressed, and display content on the display in response to addressing the abnormal output state.

In FIG. 9, the sink device 100 may switch the guidance screen 801 to a content screen 901 on the display 901 in response to the termination of the abnormal output state. In an embodiment, the content screen 901 refers to an image screen based on AV data. In an embodiment, the sink device 100 may transmit EDID information with a changed block structure to the source device 200, and the source device 200 may transmit AV data to the sink device 100 based on the changed EDID information. The sink device 100 may output the received AV data in the form of an image or a sound.

According to an embodiment of the disclosure, the sink device 100 and the source device 200 may automatically identify problems with the block structure of the EDID information and further address the problems with the block structure of the EDID information to provide the content screen 901 to the user regardless of user input.

Figure 10:
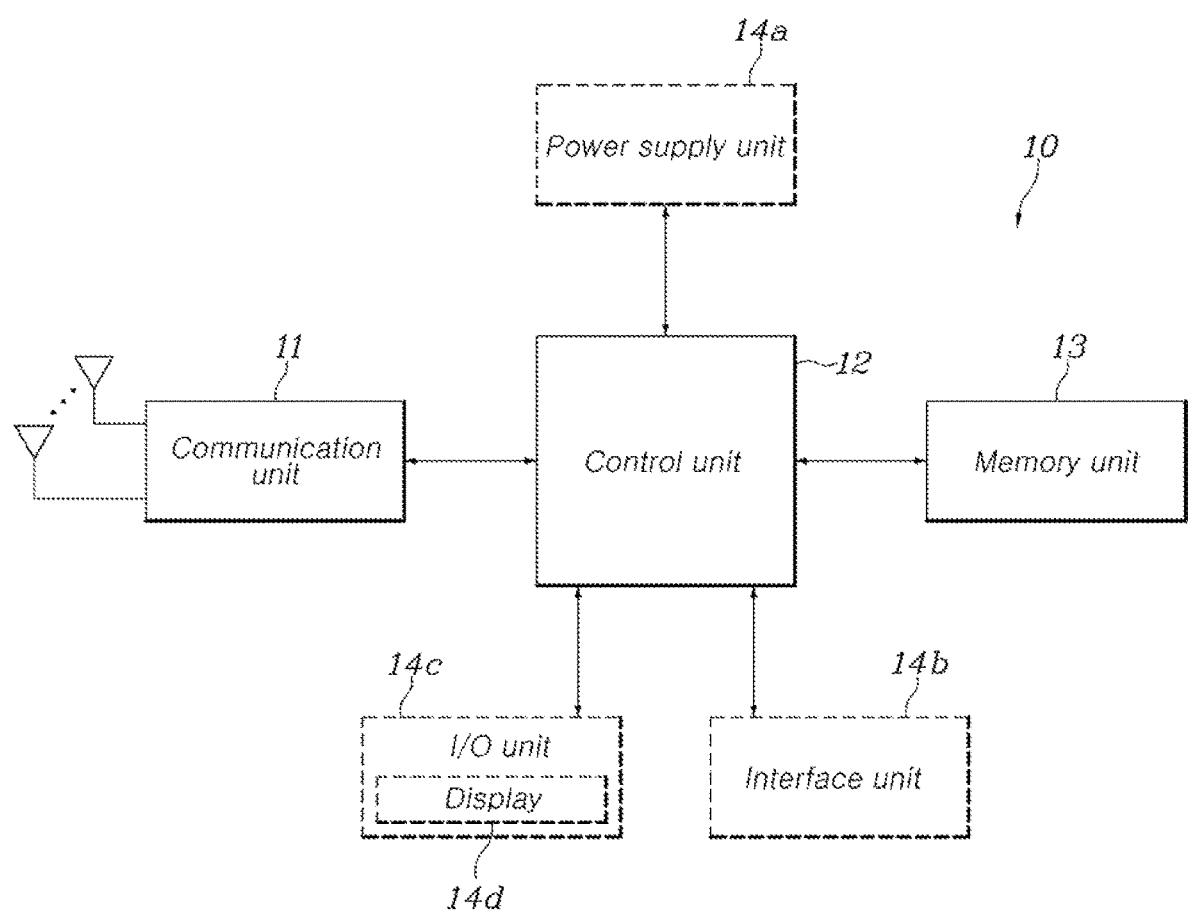
FIG. 10 illustrates an example of an electronic device according to an embodiment of the disclosure.

FIG. 10 exemplifies an electronic device applied to an embodiment of the disclosure.

Referring to FIG. 10, an electronic device 10 may include a communication unit 11, a control unit 12, a memory unit 13, a power supply unit 14a, an interface unit 14b, and an input/output unit 14c. The antenna unit may be configured as part of the communication unit 11.

The communication unit 11 may transmit and receive signals (e.g., data, control signals, etc.) with other wireless devices, access points (APs), and base stations. The control unit 12 may control the components of the electronic device 10 to perform various operations. The control unit 12 may include an application processor (AP). The memory unit 13 may store data, parameters, programs, codes, and commands necessary for operation of the electronic device 10. Further, the memory unit 13 may store data, information, and the like that are input and output. The power supply unit 14a provides power to the electronic device 10, and may include a wired/wireless charging circuit or battery. The interface unit 14b may support the connection of the electronic device 10 to other external devices. The interface unit 14b may include various ports (e.g., audio input/output ports or video input/output ports) for connecting with external devices. The input/output unit 14c may input or output image information, signals, audio information, signals, data, and/or information input from the user. The input/output unit 14c may include, e.g., a camera, a microphone, a user input unit, a display unit 14d, a speaker, and/or a haptic module.

As an example, in the case of data communication, the input/output unit 14c may obtain information or signals (e.g., touch, text, voice, image, video) input from the user, and the obtained information and signals may be stored in the memory unit 13. The communication unit 11 may convert the information and signals stored in the memory into wireless signals, and may transmit the converted wireless signals directly to another wireless device or to a base station. Further, the communication unit 11 may receive a wireless signal from another wireless device or base station, and then restore the received wireless signal to its original information or signal. The restored information or signal may be stored in the memory unit 13 and then output in various forms (e.g., text, voice, image, video, haptic) via the input/output unit 14c.

Various elements, components, units/parts, and/or modules in the electronic device 10 may be all interconnected through a wired interface, or at least some thereof may be wirelessly connected through the communication unit 11. For example, within the electronic device 10, the control unit 12 and the communication unit 11 may be wiredly connected to each other. Further, each element, component, unit/part, and/or module in the electronic device 10 may further include one or more elements. For example, the control unit 12 may be configured as one or more processor sets. For example, the control unit 12 may be configured as a set of a communication control processor, an application processor, an electronic control unit (ECU), a graphic processing processor, and a memory control processor. As another example, the memory unit 13 may be configured as a random access memory (RAM), a dynamic RAM (DRAM), a read only memory (ROM), a flash memory, a volatile memory, and a non-volatile memory and/or a combination thereof.

According to one or more embodiments, the electronic device may be one of various types of electronic devices. The electronic devices may include, e.g., a display device, a portable communication device (e.g., a smartphone), a computer device, a portable multimedia device, a portable medical device, a camera, a wearable device, or a home appliance. The electronic devices according to an embodiment are not limited to those described above.

According to one or more embodiments, the disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, and may interchangeably be used with other terms, e.g., "logic," "logic block," "part," or "circuitry". A part or module may be a single integral component, or a minimum unit or part thereof, adapted to perform one or more functions. For example, according to an embodiment, 'part' or 'module' may be implemented in a form of an application-specific integrated circuit (ASIC).

As used in one or more embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the electronic device 100, 200, or 10 described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities. Some of the plurality of entities may be separately disposed in different components. According to one or more embodiments, one or more of the above-described components may be omitted, or one or more other components may be added. Alternatively or further, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed:

1. A first electronic device comprising:
    memory;
    at least one transceiver; and
    at least one processor operatively connected with the memory and the at least one transceiver, the at least one processor configured to:
        transmit first extended display identification data (EDID) information comprising a first block structure to a second electronic device;
        receive audio/video (AV) data from the second electronic device;
        identify an output state of the AV data;
        based on identification that the output state of the AV data is abnormal, transmit a request for a first parameter to the second electronic device, wherein the first parameter is related to a number of blocks of the first EDID information stored in the second electronic device;
        in response to the request, receive the first parameter from the second electronic device;
        generate second EDID information comprising a second block structure based on at least one of: (i) the first parameter and a second parameter, or (ii) the first parameter and a third parameter,
            wherein the second parameter is related to a number of acknowledgments (ACKs) obtained based on storing the first EDID information in the memory, and
            wherein the third parameter is related to a number of blocks of the first EDID information stored in the memory; and
        transmit a hot plug detect (HPD) signal for transmitting the second EDID information to the second electronic device.

2. The first electronic device of claim 1, wherein the first electronic device is a sink device and the second electronic device is a source device.

3. The first electronic device of claim 1, wherein the second EDID information is generated based on (a) a correlation between the first parameter and the second parameter and (b) a correlation between the first parameter and the third parameter.

4. The first electronic device of claim 1, wherein the second EDID information is generated based on the first parameter being different from the third parameter.

5. The first electronic device of claim 1, wherein the second EDID information is generated based on a difference between the first parameter and the second parameter, and wherein the difference between the first parameter and the second parameter is different from a predetermined value.

6. The first electronic device of claim 1, wherein the first block structure is a four (4) block EDID structure defined based on at least one of VESA, extension block map, CEA-861, and CEA-861/display identification data.

7. The first electronic device of claim 1, wherein the second block structure is a two (2) block EDID structure defined based on at least one of VESA and CEA-861.

8. The first electronic device of claim 1, wherein the first block structure and the second block structure respectively comprise a plurality of blocks,
    wherein each of the plurality of blocks comprises 128 bytes, and
    wherein the ACKs comprise one (1) bit per each byte of one block.

9. The first electronic device of claim 1, wherein the output state comprises at least one of black screen, no signal, and no sound.

10. The first electronic device of claim 1, wherein the at least one processor, based on identification that the output state is normal, is further configured to generate the second EDID information or to output the received AV data through a display or a speaker without transmitting the HPD signal.

11. A second electronic device comprising:
    memory;
    at least one transceiver; and
    at least one processor operatively connected with the memory and the at least one transceiver, the at least one processor configured to:
        receive first extended display identification data (EDID) information comprising a first block structure from a first electronic device;
        store the first EDID information in the memory;
        transmit audio/video (AV) data to the first electronic device based on the first EDID information;
        receive a request for a first parameter from the first electronic device;
        in response to the request, transmit the first parameter to the first electronic device, wherein the first parameter is related to a number of blocks of the first EDID information stored in the memory; and
        receive a hot plug detect (HPD) signal for receiving second EDID information comprising a second block structure from the first electronic device,
            wherein the second EDID information is generated based on at least one of: (i) the first parameter and a second parameter, or (ii) the first parameter and a third parameter,
            wherein the second parameter is related to a number of acknowledgments (ACKs) obtained based on storing the first EDID information in the first electronic device, and
            wherein the third parameter is related to a number of blocks of the first EDID information stored in the first electronic device.

12. The second electronic device of claim 11, wherein the first electronic device is a sink device and the second electronic device is a source device.

13. The second electronic device of claim 11, wherein the first block structure is a four (4) block EDID structure defined based on at least one of VESA, extension block map, CEA-861, and CEA-861/display identification data.

14. The second electronic device of claim 11, wherein the second block structure is a two (2) block EDID structure defined based on at least one of VESA and CEA-861.

15. The second electronic device of claim 11, wherein the second EDID information is generated based on (a) a correlation between the first parameter and the second parameter and (b) a correlation between the first parameter and the third parameter.

16. The second electronic device of claim 11, wherein the second EDID information is generated based on the first parameter being different from the third parameter.

17. The second electronic device of claim 11, wherein the first EDID information is transmitted/received through a display data channel.

* * * * *